Dec. 5, 1950 J. W. MOSSETT 2,532,673

PHONOGRAPH RECORD FILE

Filed Aug. 14, 1947

INVENTOR.
James W. Mossett
BY Zoltan H. Polachek
ATTORNEY

Patented Dec. 5, 1950 2,532,673

UNITED STATES PATENT OFFICE 2,532,673

PHONOGRAPH RECORD FILE

James W. Mossett, New York, N. Y.

Application August 14, 1947, Serial No. 768,633

2 Claims. (Cl. 312—15)

This invention relates to a phonograph record file.

It is an object of the present invention to provide a phonograph record file adapted to retain a stack of records and which has separate retractable bands for withdrawing the records from their storage space within the file and wherein the handles for withdrawing the records are located adjacent name plate elements which are carried on the end of the band and retractible with the band to show which records have been removed and which records are available.

Another object of the present invention is to provide a record file which can be readily installed within a cabinet which is shaped so that the stack of records will be inclined rearwardly with the topmost record being extended rearwardly to the maximum extent while the bottommost record is offset outwardly whereby to make it more easy to return and receive the records from the file.

Another object of the present invention is to provide a simple means for retaining the record when inserted within the file and a means for extracting it comprising a band which will engage a substantial distance about the periphery about the record so as not to place great pressure upon the same in such a manner as might cause breakage.

Other objects of the present invention are to provide a phonograph record file and extracting device for records which is of simple construction, inexpensive to manufacture and efficient in operation.

According to the invention, there is provided a U-shaped casing arranged to have its back wall inclined upwardly and rearwardly and having an open front into which partitions are extended to contain the records. On the individual partitions, there is provided a band which is curved at its rear and which can be pulled out to withdraw the records from an indentation into which the same has been extended. One side of the band extends to the front of the arrangement and has a handle which can be pivoted outwardly when it is desired to pull a record out, such handle also having a name plate arrangement on it to identify the record. The opposite side of the band is pivoted to the partition and the record is wedged between that side of the band and an indentation or guide at the side of the band which is pulled, the indentation being in the guide which guides the band as it is pulled. The partitions have spacing elements on the top and bottom which will cooperate with the spacing elements on the top and bottom of other partitions. The partitions with the records are stacked one above the other within the rearwardly and upwardly inclined casing. The uppermost record will be offset rearwardly from the lowermost record or any of the records located thereunder.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figures 1, 2, 3, 4, 5, 6, 7, 8, 9, 10:
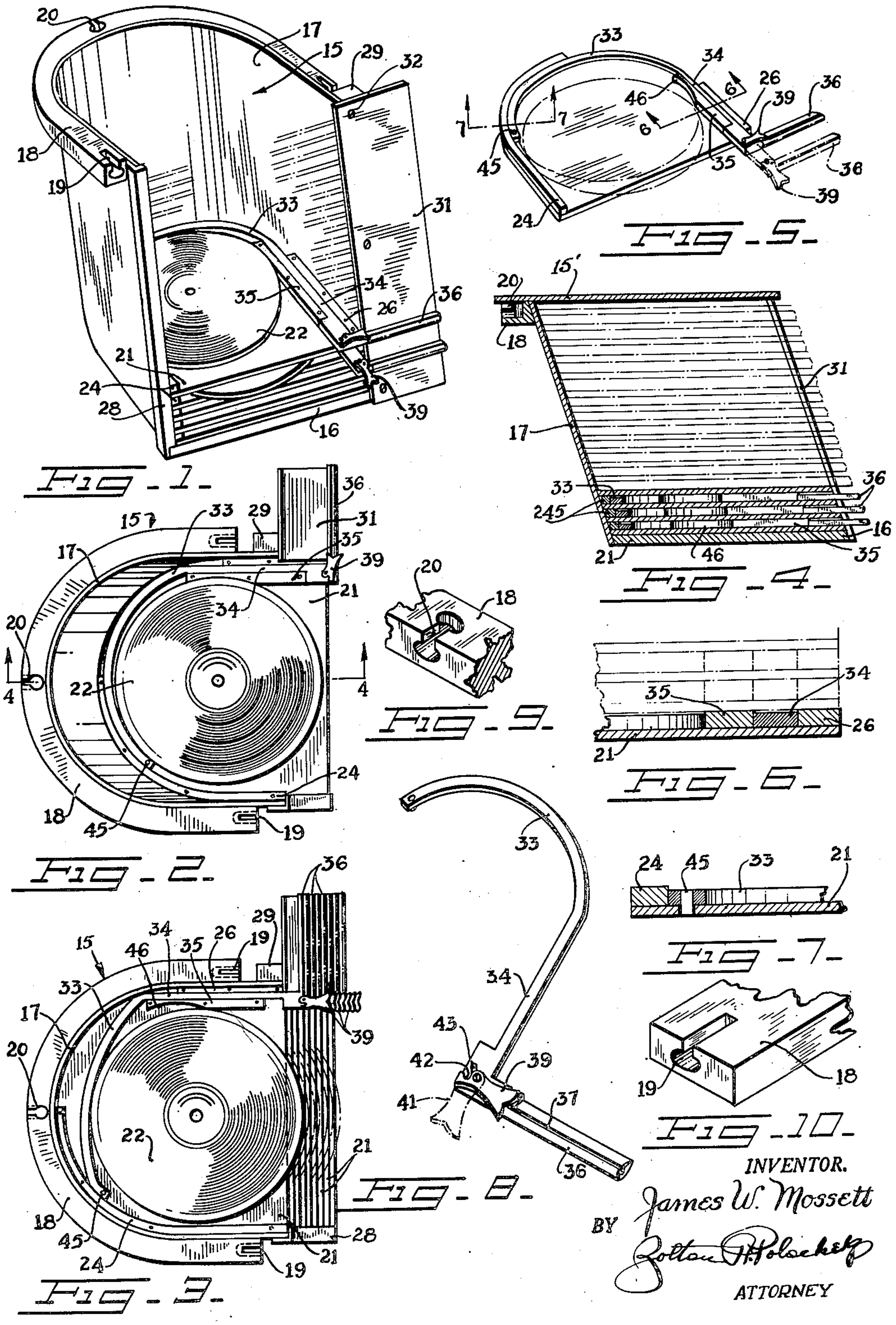
Fig. 1 is a perspective view of the casing with several record partitions mounted therein with records thereon, showing one of the bands serving to pull a record from the partitions.
Fig. 2 is a top plan view of the casing and the partitions shown in Fig. 1 but with a record disposed on the top partition.
Fig. 3 is a view similar to Fig. 2 but with the records in their outwardly extended position.
Fig. 4 is a cross sectional view, in elevation, taken on line 4—4 of Fig. 2.
Fig. 5 is a perspective view of one of the partitions removed from the casing.
Fig. 6 is a cross sectional view taken on line 6—6 of Fig. 5.
Fig. 7 is a cross sectional view taken on line 7—7 of Fig. 5 through the pivot connection for one end of the band.
Fig. 8 is a perspective view of one of the bands removed from its partition.
Fig. 9 is a fragmentary view of a part of the top flange for the casing showing the screw slots located therewithin.
Fig. 10 is a fragmentary view of the forward edge portion of the top flange of the casing showing the connecting screw slots therewithin.

Referring now to the figures, 15 represents a casing having a bottom 16 and an upwardly and rearwardly flanged back portion 17. On the top of the casing is a curved flange 18 having screw slots 19 and 20 by which the casing can be attached to the top of the compartment within a cabinet. Screws extending downwardly from the top of the cabinet are adapted to be extended into the slots 19 and 20 of the flange 18. The forward part of the casing is open so as to receive supporting partitions 21 on which phonograph record discs 22 are supported. Each of these partitions has spacing members 24 and 25 respectively, connected to top and bottom faces of the partition and at one side thereof. At the opposite side, there are similarly connected spacing members 26 which serve to maintain the partitions in counterfaced relationship at that side of the partition.

At one side of the casing and at one front edge is an angle piece 28 extending upwardly therealong. At the opposite side of the opening is an angle piece 29 which extends upwardly to which a large plate 31 is attached by screws 32.

Connected to the top of the partition 21 is a band 33 which is curved at the rear and which has a straight portion 34 which extends outwardly along one side of the partition and is guided by one of the spacing members 26 and by a driving member 35 located inwardly of the spacing member 26 to provide a guideway therebetween. On the end of the band and at one side of the casing is a laterally extending name plate 36 bearing the name of the records. This name plate may be made of rounded plastic material such as Lucite with a slot 37 into which the name plate can be extended and the lettering on the name plates will be magnified by the plastic glass or Lucite. This plastic member 36 is rigidly connected to the end of the band.

Pivotally connected to the end of band is a pull member 39 which can be moved from a position as shown in Fig. 8 where it extends in the same direction as the name plate 36 to a dotted line position 41 whereby it can be pulled outwardly so as to provide a better position by which it can be grasped to pull the band outwardly to eject the record. The pull member 39 has a recess 42 adapted to receive a stop pin 43 so that the amount of pivotal movement of the pull member 39 in a clockwise direction will be limited.

The opposite end of the band 33 is pivotally connected to the opposite side of the partition as indicated at 45 by a pivot pin projecting from a hole in the partition 21. The band surrounds substantially the entire rear edge of the record 22.

The piece 35 has a round or curved recess 46 for retaining the edge of the disc. The disc when pushed rearwardly will engage at one side of the partition and with spacing piece 24 and as it is pivoted inwardly it will have its other edge fall into the curved recess 46 of the piece 35 whereby to cause the record to be retained against outward displacement. To thereafter withdraw the record, the band is pulled outwardly and will engage with the rear edge of the record so as to cause the record to be pivoted out of the curved recess 46 and to be free of the same so that it can be picked out of the partition. As the record is released from the recess, it will no longer be in tight engagement between the piece 24 but will be free thereof. To reinsert the record, the pressure is applied to the forward edge and as the same is moved rearwardly it will be pivoted into the recess 46.

The partitions with the records thereon are stacked one above the other and inasmuch as the rear portion of the casing is inclined upwardly and rearwardly, the top partition and record will be disposed inwardly of the lower partition and record so that the various records will be more easily accessible.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A phonograph record file comprising a casing having a rounded rear wall portion and an open front portion, partitions adapted to be extended into the front of the casing and supported therewithin, spacing elements on the opposite faces of the partition to retain the partitions in vertically spaced relationship, an extracting band for the records connected to the top face of a partition and having an extension adapted to be pulled forwardly out of the partition in order to extract the records therefrom, said band extending from one side of the partition to the other and at the side opposite to the extension being pivoted to the partition, and a pivoted pull member adapted to be pivoted outwardly from a laterally extending position when the record is to be pulled and adapted to be returned to the lateral position after the record has been reinserted, and a stop for limiting the outward pivotal movement of the pull handle.

2. In a phonograph record file having a cabinet including an open front and a plurality of vertically spaced partitions upon each of which a phonograph record is rested, means on each of said partitions for facilitating extraction of the respective record, comprising an extracting band for each partition and positioned on the top face thereof, said band having an extension at one end projected slightly forward of the front edge of the respective partition, said band having its other end curved to extend behind the respective record and pivotally connected to the respective partition, a pull member pivotally mounted on said extension and normally extended laterally of said extension to be outwardly pivoted to a position in alignment with said extension providing a grip by which said band may be pivoted about its pivotally attached end for partially ejecting the respective record, and means limiting outward pivoting of said pull member to a position in which said pull member is in alignment with said extension.

JAMES W. MOSSETT.

REFERENCES CITED

The following references are of record in the file of this patent:

UNITED STATES PATENTS

| Number | Name | Date |
|---|---|---|
| 1,032,457 | White | July 16, 1912 |
| 1,130,016 | Perfield | Mar. 2, 1915 |
| 1,378,117 | Houley | May 17, 1921 |

FOREIGN PATENTS

| Number | Country | Date |
|---|---|---|
| 45,226 | France | Apr. 8, 1935 |
| 669,026 | France | July 27, 1929 |